July 23, 1929.   C. E. MOORE   1,721,524
FEED SCREW LIMIT GAUGE FOR LATHES
Filed Oct. 3, 1927
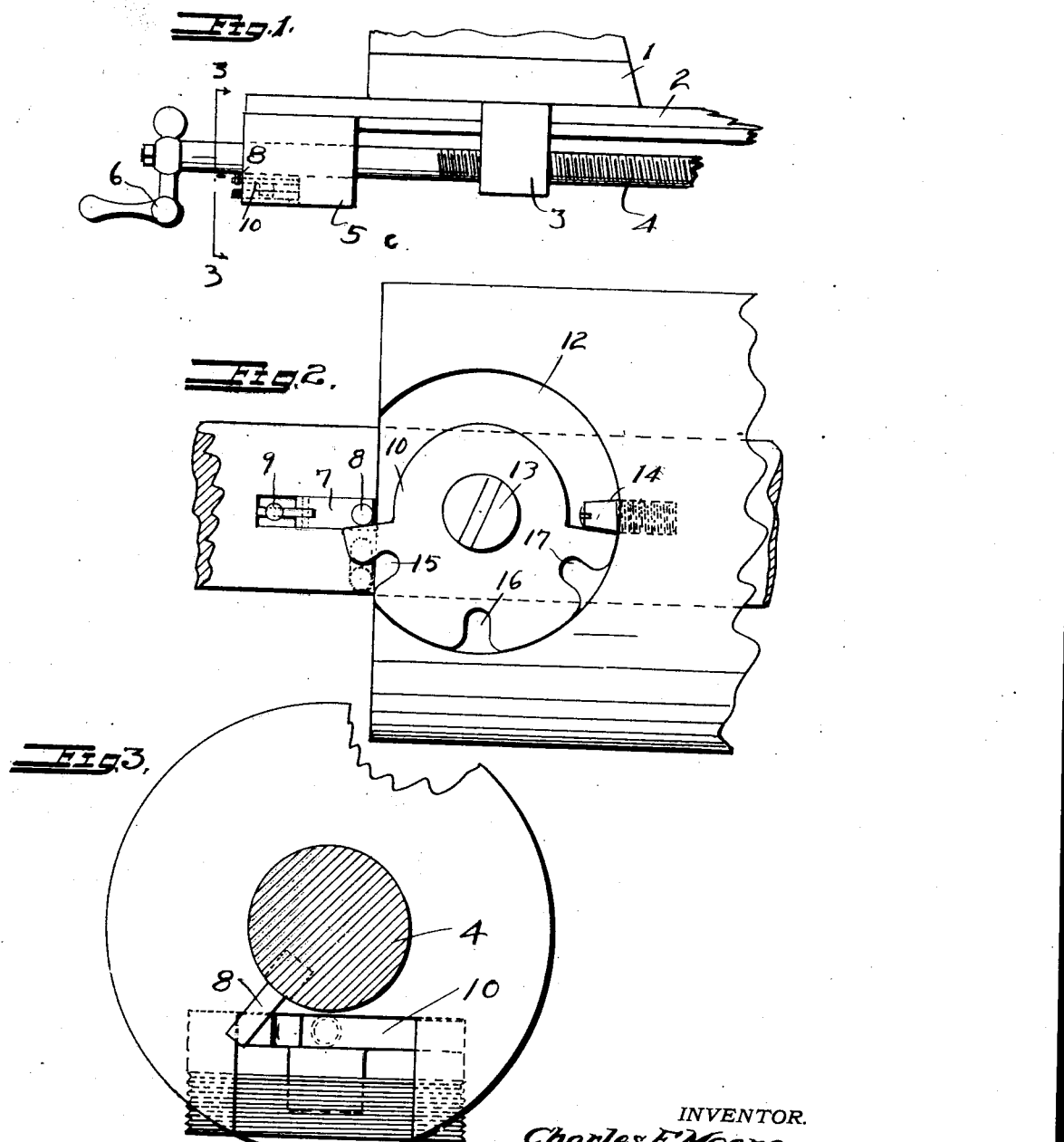
INVENTOR.
Charles E. Moore.
BY
Carlos P. Griffin
ATTORNEY.

Patented July 23, 1929.

1,721,524

UNITED STATES PATENT OFFICE.

CHARLES E. MOORE, OF SAN FRANCISCO, CALIFORNIA.

FEED-SCREW LIMIT GAUGE FOR LATHES.

Application filed October 3, 1927. Serial No. 223,504.

This invention relates to a stop for the feed screw of the tool holding table or carriage on a lathe, and its object is to enable the tool holder to be moved away from the work a fixed number of threads whenever that becomes necessary, and to thereafter move the tool holder back to its original position with certainty and accuracy without examining the micrometer or other scale to ascertain the final position of the cutting tool.

It will be understood by those skilled in the art that at the present time in cutting the threads it is usual to set the tool holder feed table at the desired angle on the lathe carriage. The lathe carriage then is moved directly away from the axis of the lathe center and whatever feed is desired to produce the threads is thereafter given to the tool holding member by moving it along the desired angle and thereby the thread is cut on one side instead of on both sides as would be the case if the tool would be moved normally toward the axis.

Stops at present in use do not enable the lathe carriage to be moved to its initial position after being moved back to shift the tool with sufficient accuracy, and the present invention is intended to provide means whereby the lathe carriage may be moved away from the axis of the lathe and toward the axis of the lathe with precision without examining the stops by which this movement is effected.

While in the present case it has been stated that this invention is particularly applicable to the carriage of a lathe, it will be understood by those skilled in the art that there are a number of ways in which this particular apparatus can be used on lathes or other cutting machinery of that character whether the present invention be applied to a so-called lathe table carriage carrying a cutter, or to any work table where it might be more satisfactory to move the work back from the cutter instead of the cutter away from the work, the principal object being to restore the relative position of cutter and work without the necessity of making outright measurements or examinations of the micrometer to effect this result.

In the present case an interrupted gear which permits the feed screw to turn a fixed number of turns in opposite directions is used to effect the stopping of the lathe carriage and this same means is used to enable the carriage to be returned to precisely the original position.

A further object of the invention is to facilitate the making of duplicate parts, the apparatus being so arranged as to return the tool each time it is moved to precisely its original position.

Other objects of the invention will be apparent as the description proceeds.

An embodiment of the invention is shown in the accompanying drawings in which the same reference numeral is applied to the same portion throughout the several figures of the drawings and of which there may be modifications.

Figure 1 is a view in elevation of a portion of the tool holder, a portion of the slidable bed on the lathe, and a portion of the feed screw,

Figure 2 is a bottom plan view of the stop movement and the screw showing the screw at the end of one of its travels, Figure 3 is a view in elevation on the line 3—3 Figure 1 looking in the direction of the arrow.

The numeral 1 represents the movable work carrier or movable tool carrier which is slidable on the carrier bed 2. A depending lug 3 on the work holder, or tool holder has the adjusting screw 4 which traverses the tool holder across the carriage. There is also a depending lug 5 on the carrier 2 through which the feed screw 4 passes, and said feed screw is rotated by means of the crank 6 on its outer end.

The feed screw 4 has a groove therein to receive a slidable plate 7 which has a pin 8, and a retaining latch 9. The retaining latch is merely for the purpose of holding the slide 7 in the position shown in Figure 2, but the slide 7 may be pulled out of that position, and out far enough so that the pin 8 will not engage the interrupted gear 10 at will.

In the bottom of the bearing 5 there is a recess 12 in which the plate or interrupted gear 10 is mounted, said plate being carried by a short stud 13. The plate 13 can only turn a portion of a revolution and it is stopped by means of the set screw 14. In the present instance the plate 10 has three slots, 15, 16 and 17 therein, the object being to enable the feed screw 4 to be turned three complete revolutions with the pin in engagement with said slot before the feed screw is stopped, this being a convenient distance to bring the tool away from the work when it is desired to traverse the tool along the lathe bed to start at some other portion of the work. It will be seen that the arrangement of the slots and the disks is such that as the feed screw 4 rotates the plate 10 will be turned just enough for the screw 8 to pick up the slot 15 after it has once passed through the slot 16, and on the next turn it will pass through the slot 17 and rotate the plate 10 a little further.

In the present instance the feed screw can turn three times before the plate 10 will stop it, and it can be returned to the original position by a reverse movement.

Having thus described my invention, what I desire to secure by Letters Patent of the United States is as follows, but modifications may be made in carrying out the invention as shown in the drawings and in the above particularly described form thereof, within the purview of the annexed claims.

I claim:

1. In a stop movement for lathe feed screws, the combination with a tool holder, a feed screw therefor, an interrupted gear revolubly mounted on a fixed portion of the lathe, means on the said fixed portion of the lathe to permit the interrupted gear to turn a given amount, means on the feed screw to turn the interrupted gear a portion of a turn each time the feed screw is turned whereby the feed screw may be rotated a fixed number of turns in either direction, an abutment on the feed screw, and means to remove the abutment from contact with the interrupted gear at will.

2. In a stop movement for lathe feed screws, the combination with a tool holder and lathe carriage of a feed screw for the carriage, a slidable pin on said screw, an interrupted gear mounted on said lathe for permitting said pin on the feed screw to turn said gear in one direction, and move the tool holder away from the axis of the lathe and to turn said gear in the opposite direction to cause the tool holder to be restored to its initial position without the examination of micrometer or scales.

In testimony whereof I have hereunto set my hand this 24th day of September, A. D. 1927.

CHARLES E. MOORE.